(12) United States Patent
Dekker et al.

(10) Patent No.: US 6,683,833 B2
(45) Date of Patent: Jan. 27, 2004

(54) DEVICE FOR SCANNING A ROTATING INFORMATION CARRIER

(75) Inventors: Anthonius L. J. Dekker, Eindhoven (NL); Antonius H. M. Akkermans, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 423 days.

(21) Appl. No.: 09/734,076

(22) Filed: Dec. 11, 2000

(65) Prior Publication Data

US 2001/0005342 A1 Jun. 28, 2001

(30) Foreign Application Priority Data

Dec. 10, 1999 (EP) .............................................. 99204183

(51) Int. Cl.[7] ................................................. G11B 7/00
(52) U.S. Cl. ............................ 369/44.29; 369/47.38; 369/53.35
(58) Field of Search ..................... 369/44.28, 44.29, 369/44.34, 44.35, 47.33, 47.34, 47.35, 53.35, 53.36, 30.11, 30.21, 30.22, 47.36, 47.38, 47.41, 47.45, 47.46, 47.48

(56) References Cited

U.S. PATENT DOCUMENTS 4,286,318 A * 8/1981 Immink et al. .......... 369/44.35

5,559,768 A * 9/1996 Ito et al. .................. 369/44.28

FOREIGN PATENT DOCUMENTS

| JP | 54067406 | 11/1977 |
|----|----------|---------|
| JP | 56065211 | 11/1979 |
| JP | 61034736 | 7/1984 |
| WO | WO9613898 | 5/1996 |

* cited by examiner

Primary Examiner—Thang V. Tran
(74) Attorney, Agent, or Firm—Michael E. Belk

(57) ABSTRACT

A device according to the invention for scanning a rotating information carrier (2) comprises a transducer (10) and controller (20, 22) for controlling a scanning parameter of the transducer (10), such as the radial position and the setting of a focus. The controller comprise difference signal generator (20) for generating a difference signal (RE) which is indicative of a difference between a current value and a desired value of the scanning parameter, and correction signal generator (22) for generating a correction signal ($S_C$) in response to the difference signal. The correction signal generator (22) comprise a delay loop (25) having first in first out memory (36) for generating a delayed signal ($S_{DL1}$) and feedback filter (38) for filtering the delayed signal ($S_{DL1}$). The device comprises rotation speed detector (8) for generating a clock signal (CL) having a frequency which is indicative of the rotation speed of the information carrier (2), the delay in the memory (36) being proportional to a period of the clock signal.

6 Claims, 8 Drawing Sheets

DEVICE FOR SCANNING A ROTATING INFORMATION CARRIER

Figure 1:
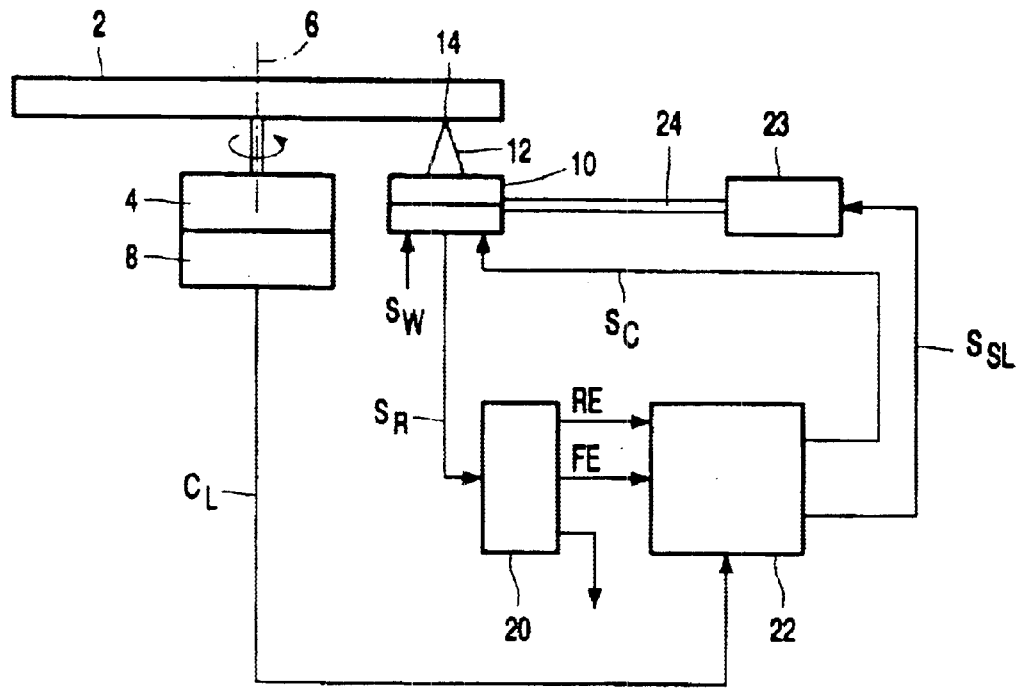

The invention relates to a device for scanning a rotating information carrier comprising
- rotating means for rotating the information carrier around an axis,
- a transducer for converting a write signal into a detectable pattern at the information carrier, and/or for detecting a pattern at the information carrier and generating a read signal in response thereto,
- control means for controlling a scanning parameter of the transducer, wherein the control means comprise
  - difference signal generating means for generating a difference signal which is indicative of a difference between a current value and a desired value of the scanning parameter,
  - correction signal generating means for generating a correction signal in response to the difference signal, the correction signal generating means comprising a delay loop which includes combination means for generating a combination signal out of a feedback signal and an input signal derived from the difference signal, first in first out memory means for generating a delayed signal out of the combined signal and feedback means for generating a feedback signal out of the delayed signal.

In a device for scanning a rotating information carrier a periodic error may occur in a position of a transducer due to an unbalanced or an eccentric information carrier. Likewise periodic errors may occur in other parameters, for example the accuracy with which a beam is focussed in an optical player. It has been found that such a periodic error may be substantially reduced by means of a controller comprising a memory loop. Such a controller has a relatively high gain for signals having a frequency corresponding to a basis frequency or the harmonics thereof. A substantial reduction of the periodic errors is achieved if the basis frequency of the memory loop corresponds to the rotation frequency of the information carrier. Such a controller is known from the patent application WO 96/13898. The known controller is designed such that its transfer function has a zero slope around the basis frequency and its harmonics, so that it is relatively insensitive to variations in the rotation frequency. However the controller still is only operable within a frequency-interval around the basis frequency. This is in particular a disadvantage in a device in which the information carrier is not rotated at a constant angular velocity, such as in CLV or in quasi-CLV systems. The frequency intervals within which the gain of the loop is relatively high can not be widened unlimitedly, because that would entail the risk of instabilities in the servo loop.

It is a purpose of the invention to provide a device for scanning a rotating information carrier, having a control system for controlling a scanning parameter, which control system is insensitive to variations in the angular velocity and which yet has a relatively high stability. For this purpose the device comprises rotation speed detecting means for generating a clock signal having a frequency which is indicative of the rotation speed of the information carrier, the delay in the memory means being proportional to a period of the clock signal. In a device according to the invention the basis frequency is accurately matched to the rotation frequency. This makes it possible to reduce the frequency intervals of relatively high gain. On the one hand this provides for a good suppression of periodic disturbances, while on the other hand the control system can have a high stability.

Figure 2:
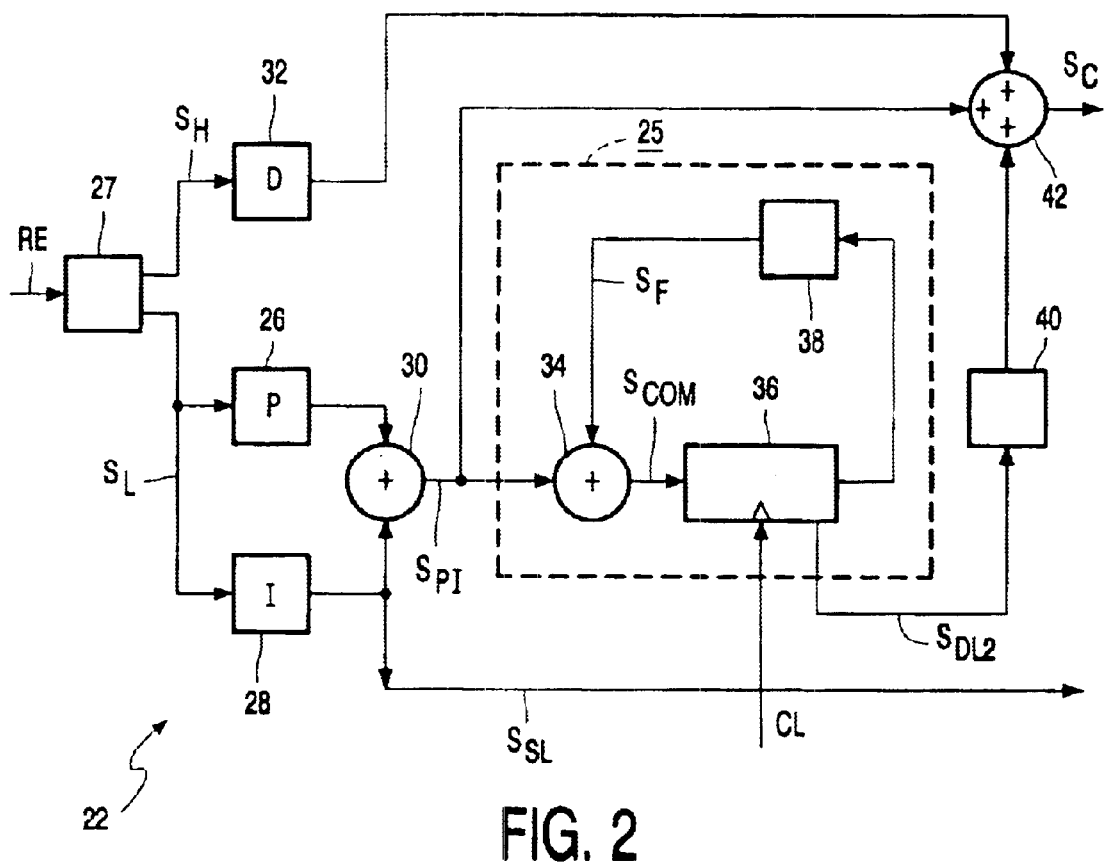
Figure 3:
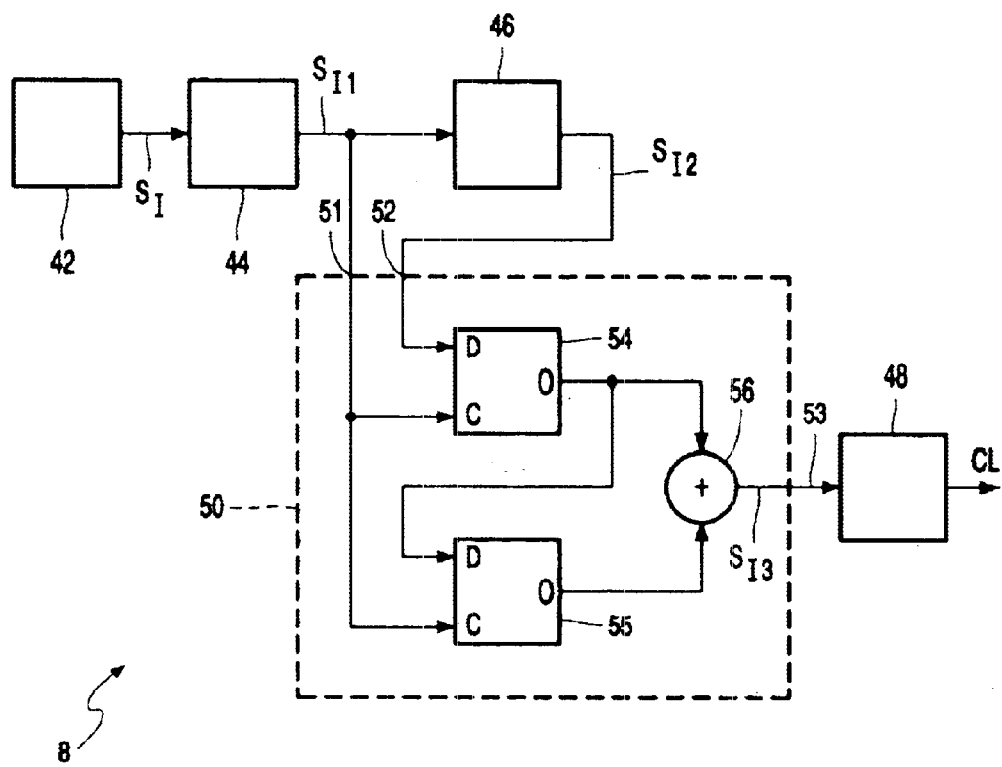
Figure 6:
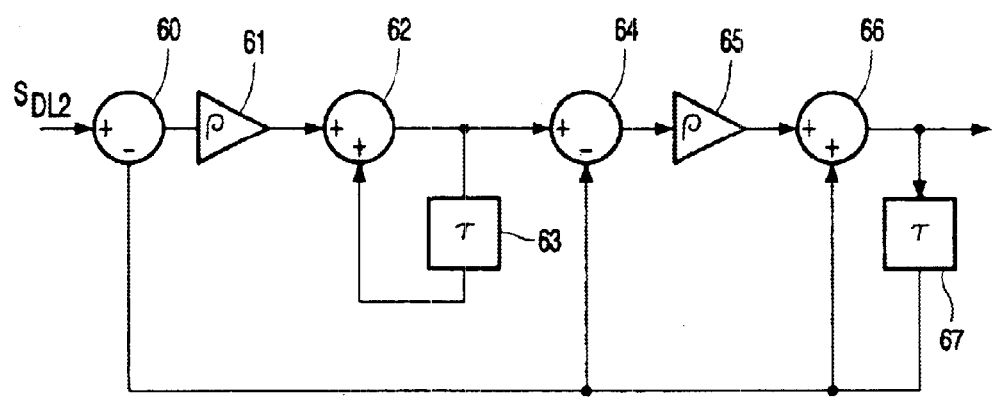
Figure 4:
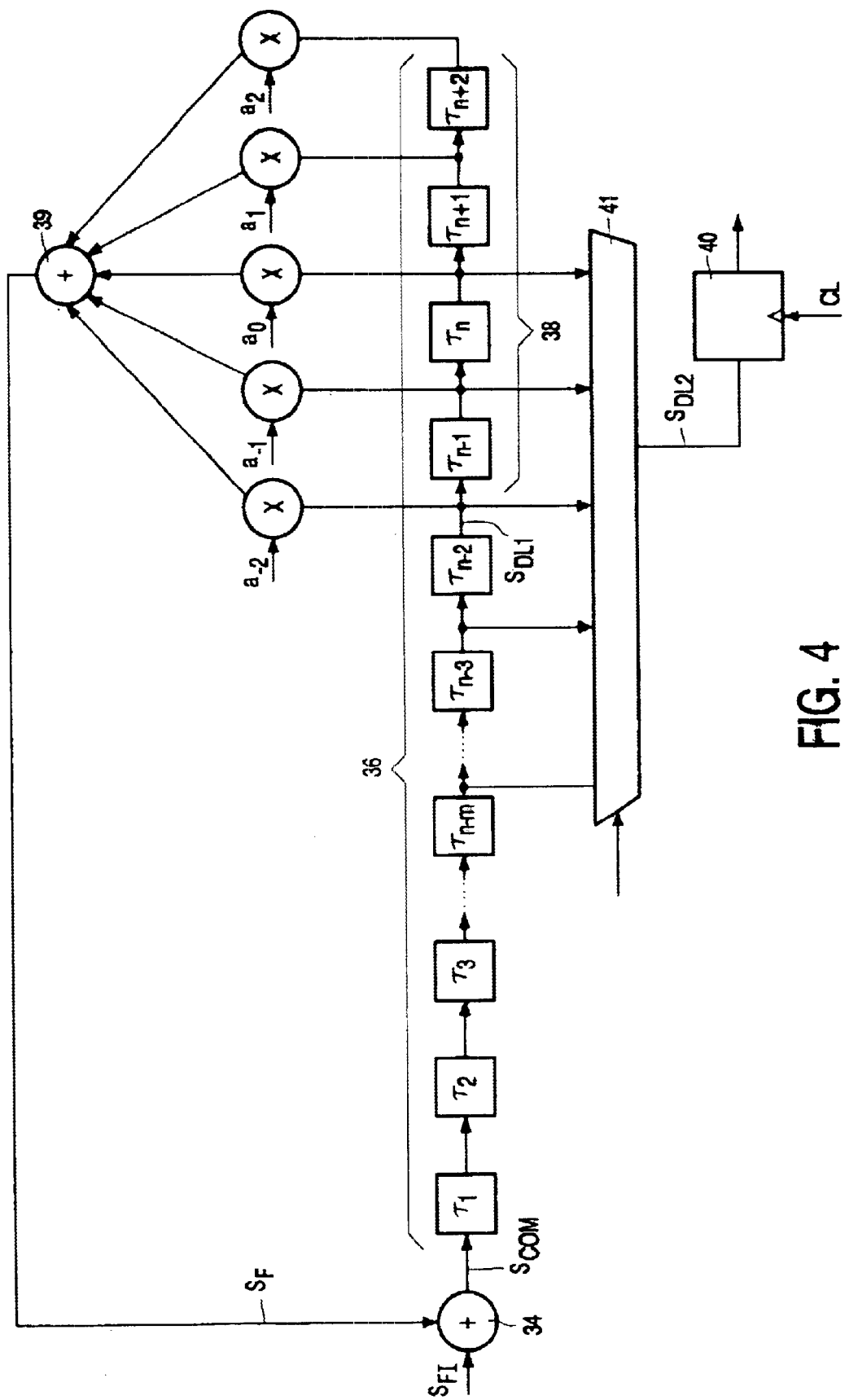
Figure 5A:
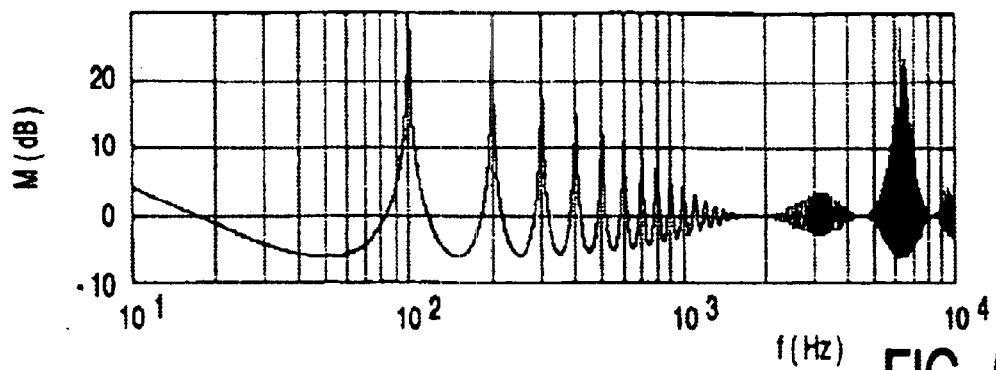
Figure 5B:
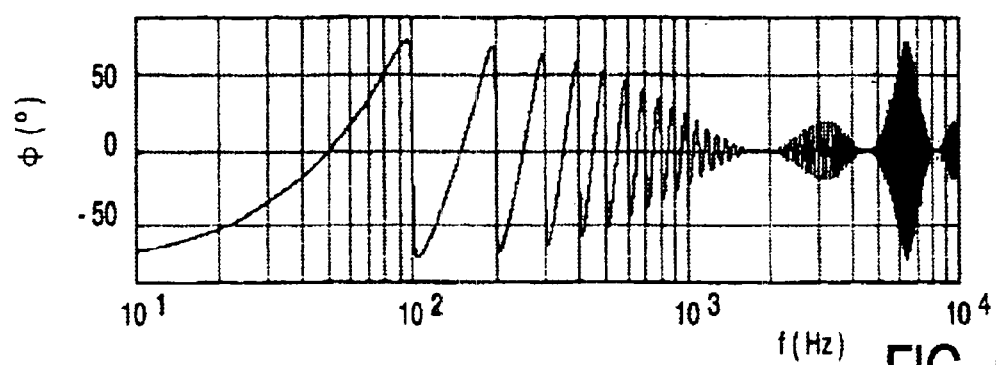
Figure 7:
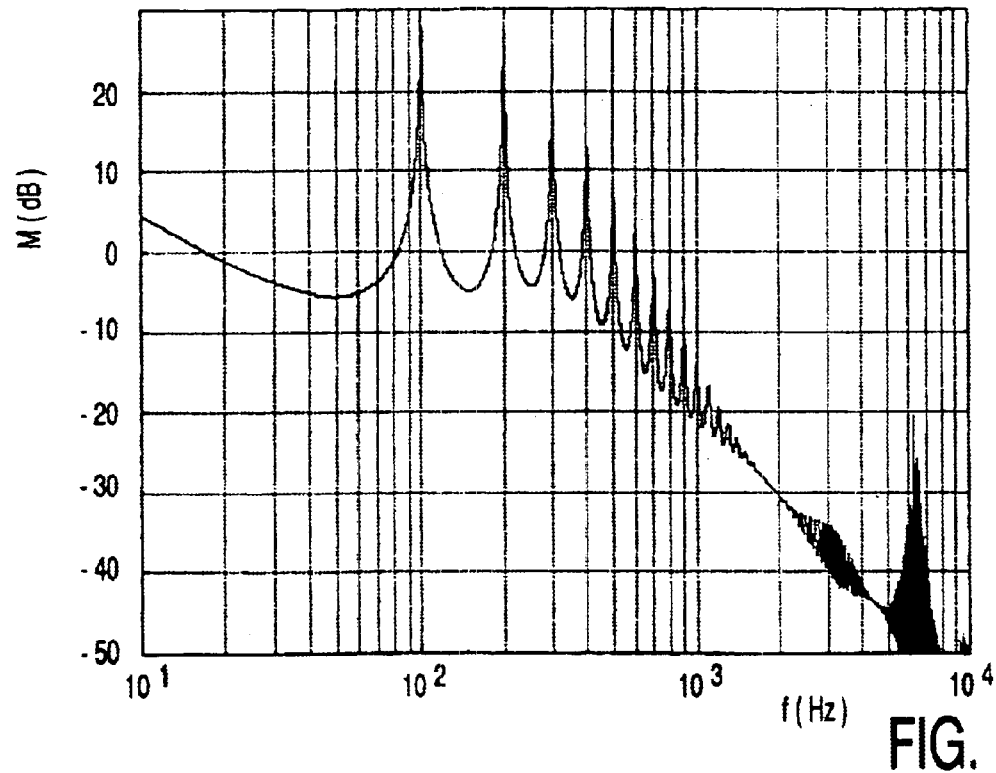
Figure 8:
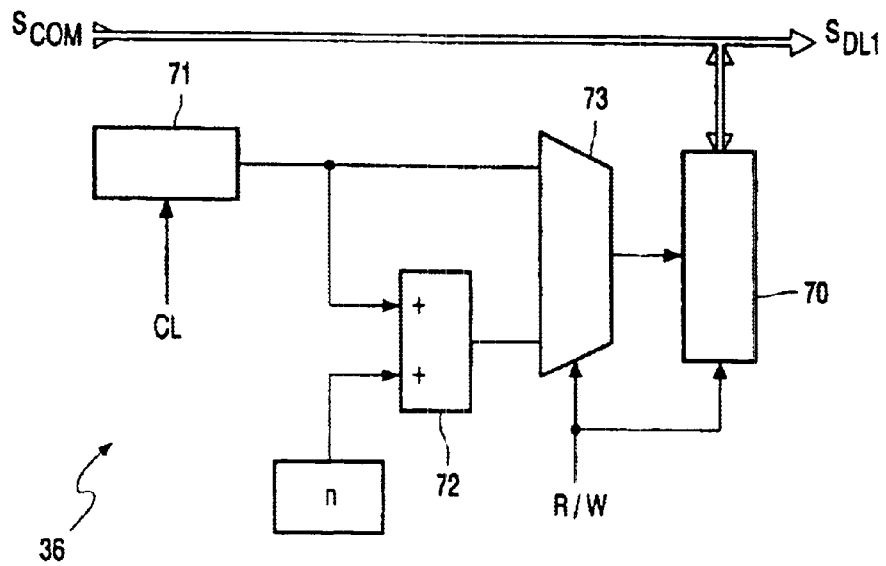
Figure 9:
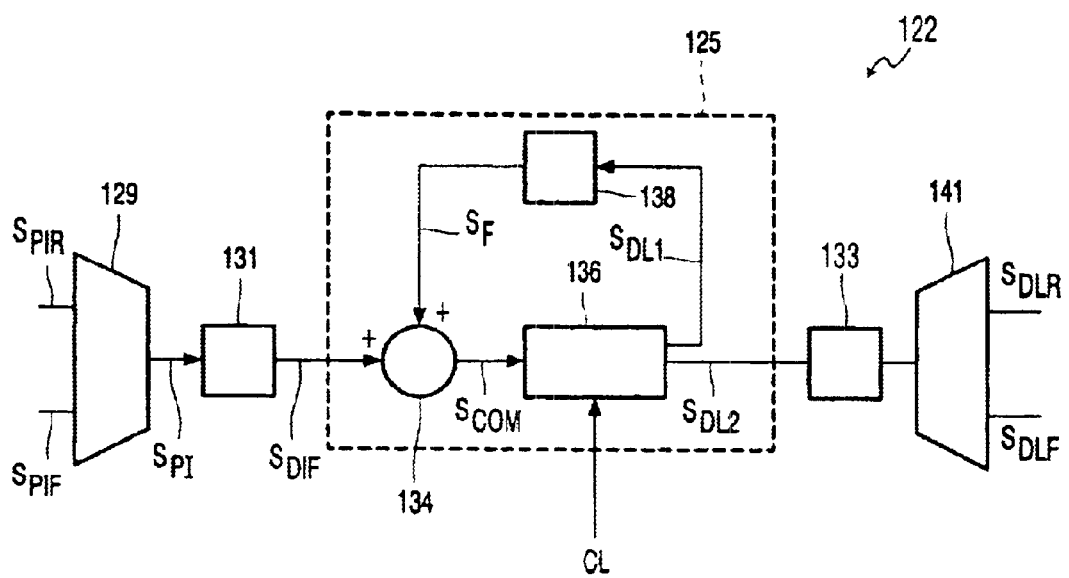
Figure 10:
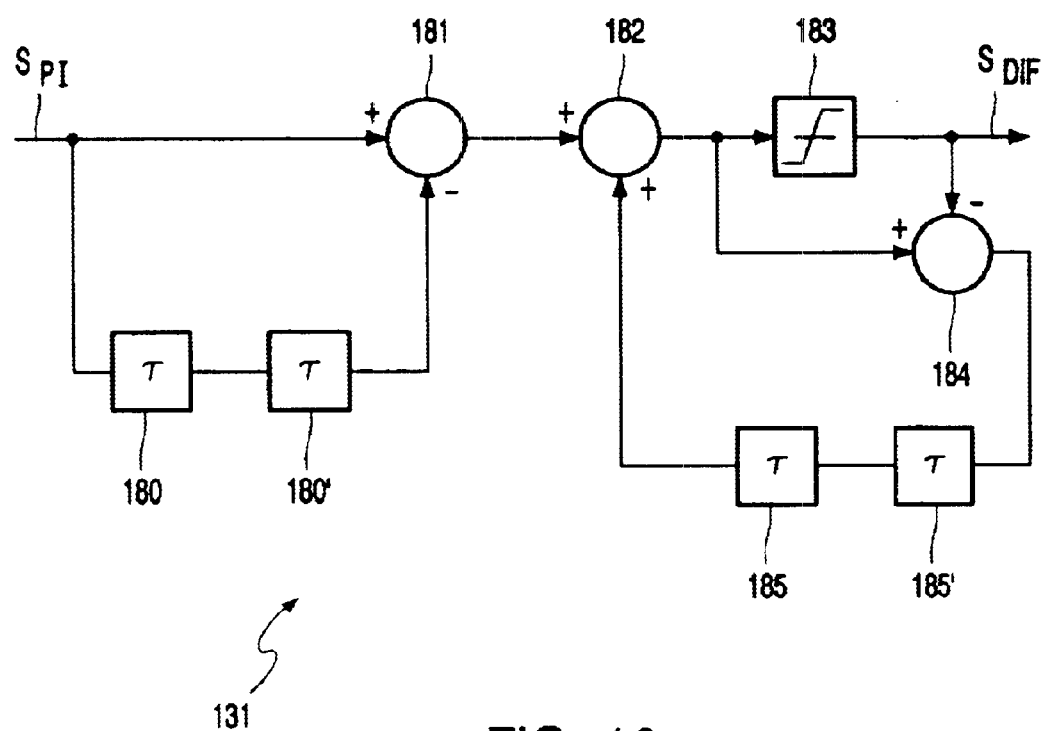
Figure 11:
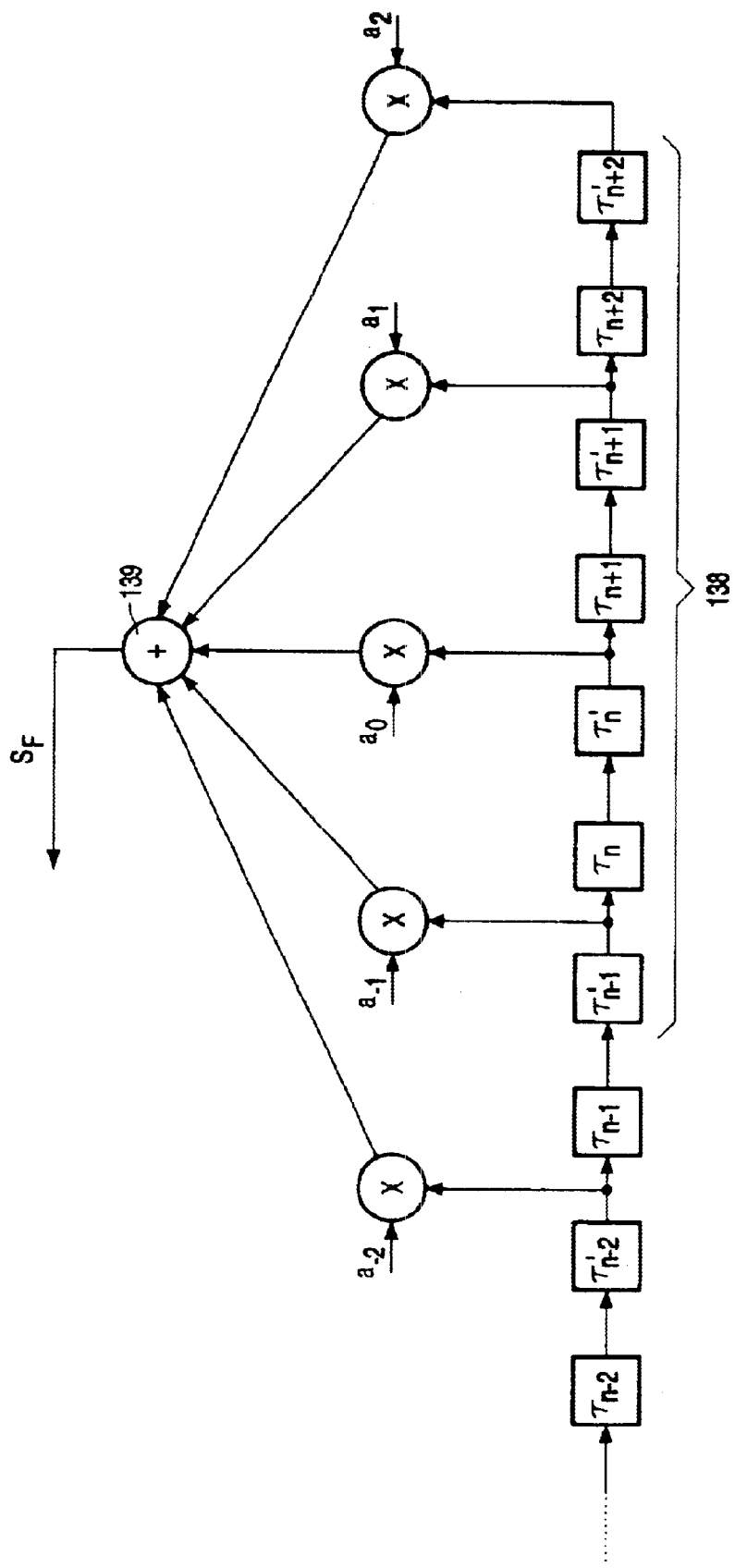
Figure 12:
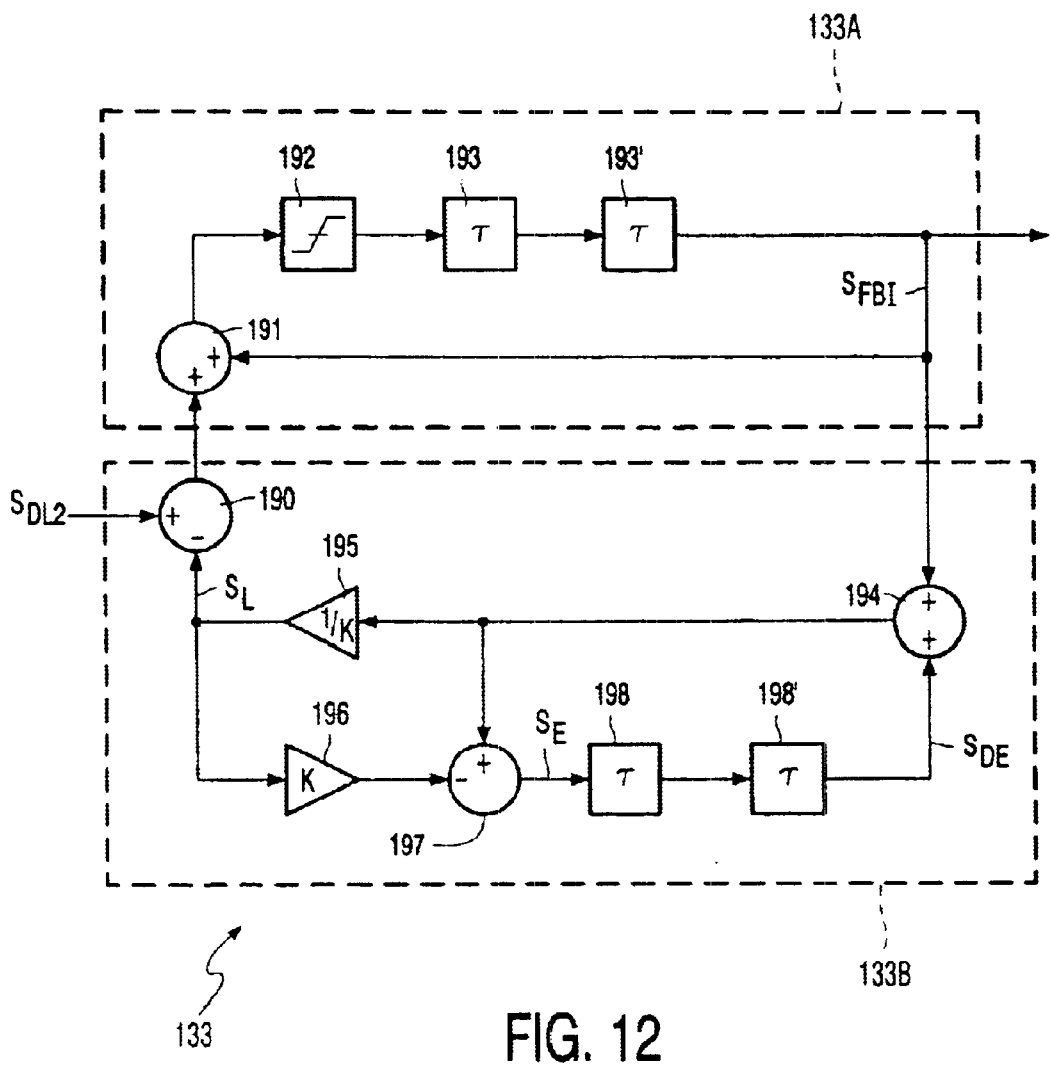

These and other aspects of the invention are disclosed in more detail in the drawing. Therein:

FIG. 1 shows an embodiment of a device according to the invention for scanning a rotating information carrier, FIG. 2 shows control signal generating means in said embodiment, FIG. 3 shows rotation speed detecting means, FIG. 4 shows in more detail a delay loop, FIG. 5A shows the magnitude M(f) of the closed loop transfer function of the delay loop, FIG. 5B shows the phase φ(f) of the closed loop transfer function of the delay loop, FIG. 6 shows an implementation of a reconstruction filter, FIG. 7 shows the magnitude M(f) of the closed loop transfer function of the combination of the delay loop of FIG. 4 and the reconstruction filter of FIG. 6, FIG. 8 shows an alternative embodiment of a portion of the control signal generating means, FIG. 9 shows a further embodiment of a portion of the control signal generating means, FIG. 10 shows in more detail differentiating means forming part of the embodiment shown in FIG. 9, FIG. 11 shows in more detail first in first out memory means and feedback filter means forming part of the embodiment of FIG. 9, FIG. 12 shows in more detail integration means forming part of the embodiment of FIG. 9.

FIG. 1 shows a device for scanning a rotating information carrier 2. The device comprises rotating means 4, in the form of a spindle motor, for rotating the information carrier around an axis 6. The device further comprises rotation speed detecting means 8 for generating a clock signal CL having a frequency which is indicative of the rotation speed of the information carrier 2. The rotation speed detecting means 8 may be implemented in different ways known to the skilled person. For example these means may comprise Hall sensors, or a detector for measuring the back-EMF in the motor windings. Otherwise the rotation speed detecting means may be implemented by an optical detector in combination with a rotating disc having an optical detectable pattern. The device further comprises a transducer 10 for converting a write signal $S_W$ into a detectable pattern at the information carrier, and/or for detecting a pattern at the information carrier and generating a read signal $S_R$ in response thereto. The transducer 10 may be in the form of a magnetic head for converting an electrical signal into a magnetical pattern at the information carrier or for detecting a magnetical pattern and generating an electrical signal in response thereto. In the present embodiment the transducer 10 is an electro-optical transducer for detecting an optical pattern at the information carrier 2 and generating an electrical read signal $S_R$. To that end the transducer 10 maps an optical beam 12 at a scanning spot 14 at the information carrier 2 and measures the radiation reflected from that spot 14. The operation of the transducer 10 is determined by one or more scanning parameters. In casu one of the scanning parameters is the radial position RE at which the beam 12 is mapped at a scanning spot 14 at the information carrier 2. The scanning parameter is controlled by control means 20, 22. These comprise difference signal generating means 20 for generating a difference signal RE which is indicative of a difference between a current value and a desired value of the scanning parameter. In this case the difference signal is a radial error signal RE, which is indicative of the radial distance of the scanning spot to the nearest track.

The control means 20, 22 further comprise correction signal generating means 22 for generating a correction signal $S_C$ in response to the difference signal RE. In addition the correction signal generating means 22 generate a control signal $S_{SL}$ for a slide motor 23 which moves the transducer 10 along a slide 24.

FIG. 2 shows the correction signal generating means 22 in more detail. In the embodiment shown the correction signal generating means 22 comprise a cross over filter 27 for separating the difference signal RE into a high frequency $S_H$ and a low frequency component $S_L$. The low frequency component $S_L$ forms an input signal for a PI-controller 26, 28, 30 comprising a proportional circuit 26 and an integrating circuit 28, as well as combination means 30 to generate a combination signal $S_{PI}$ out of the output signals of these circuits 26, 28. The output signal of the integrating circuit 28 also serves as a control signal $S_{SL}$ for the slide motor 23. The high frequency component $S_H$ forms an input of a differentiating circuit 32. The correction signal generating means 22 further comprise a delay loop 25, which comprises combination means 34 for generating a combined signal $S_{COM}$ out of an input signal $S_{PI}$ and a feedback signal $S_F$. The input signal $S_{PI}$ is the output signal $S_{PI}$ of the PI-controller 26, 28, 30, which is derived from the difference signal $S_D$. A first in first out memory means 36 generates a delayed signal $S_{DL1}$ out of the combined signal $S_{COM}$. The delay in the memory means 36 is proportional to a clock period of the clock signal CL. The first in first out memory means 36 may be implemented in different ways. For example these means may be implemented as a chain of flip-flops. Otherwise these memory means may be a RAM having an address controller for cyclically changing the read and the write address.

The correction signal generating means 22 also comprise feedback filter means 38 for filtering the delayed signal $S_{DL1}$.

The first in first out memory means 36 has a further output for providing a further delayed signal $S_{DL2}$ to a reconstruction filter 40. The correction signal generating means 22 comprises further combination means 42 to generate the control signal $S_C$ out of an output signal of the differentiating means 32, an output signal $S_{PI}$ of the PI-controller and an output signal of the reconstruction filter 40.

A device for scanning a rotating record carrier usually has a seek mode in addition to a scanning mode. Generally in the seek mode, the controller used for controlling the radial position has a setting which differs from that in the scanning mode. The device shown in FIG. 2 is characterized in that the delay loop 25 is coupled to the difference signal generating means 20 via the controller 26, 28. This has the advantage that when the device switches between seek mode and scanning mode, the data stored in the first in first out memory means remains relevant. On the contrary, in an embodiment wherein the controller is coupled to the difference signal generating means via the delay loop, the data in the first in first out memory means would be processed in a different way, when switching from one to the other mode.

In the embodiment described above the scanning parameter which is controlled is a radial error. In a further attractive embodiment, wherein the transducer 10 comprises means for mapping a radiation beam at the information carrier, the scanning parameter is indicative of a property of a scanning spot formed by the radiation beam. Said property is for example a measure for the accuracy with which the beam is focussed at an information layer of the record carrier, or a measure for radial or tangential tilt of the beam. In this case the scanning parameter is related to the accuracy of the focus. To that end the difference signal generating means 20 also generate a focus error signal FE. The correction signal generating means 22 have a further PID-controller and a delay loop similar to that shown in FIG. 2, except that a control line analogous to the control line $S_{SL}$ is superfluous.

FIG. 3 shows an embodiment of the rotation speed detecting means 8. In that embodiment the rotation speed detecting means 8 comprise a first module 42 for generating a signal $S_1$ having a first frequency $f_1$ which is indicative of the rotation speed of the information carrier 2. In this case, the first frequency $f_1$ is equal to 12 times the rotation frequency $f_{rot}$. The first module 42 comprises a plurality of Hall-sensors coupled to the rotating means 4. A second module 44 is coupled to the first module 42 for generating a first intermediate signal $S_{I1}$ having a second frequency $f_2$ which is lower than the first frequency $f_1$ of the input by an integer factor. In casu $f_2=f_1/6$. A third module 46 is coupled to the second module 44 for generating a second intermediate signal $S_{I2}$ which is an indication of the duration D between two successive pulses of the first intermediate signal $S_{I1}$. A fourth module 48 is coupled to the third module 46 for generating an output signal CL having a frequency which is dependent on the second intermediate signal $S_{I2}$.

In the embodiment shown the fourth module 48 is coupled to the third module 46 via a fifth module 50. The fifth module 50 comprises a first input 51 for receiving the first intermediate signal $S_{I1}$ and a second input 52 for receiving the second intermediate signal $S_{I2}$. The fifth module 50 has an output 53 for providing to the fourth module 48 a third intermediate signal $S_{I3}$ which is indicative of a sum of two mutually successive values of durations D. In the embodiment shown the fifth module 50 has a first and a second delay element 54, 55 and an adder 56. The first delay element 54 has a data input D coupled to the output of the third module 46 and the second delay element 55 has a data input D coupled to the output O of the first delay element 54. Both delay elements 54, 55 have a clock input C which receives the first intermediate signal $S_{I1}$. The adder 56 has a first and a second input which are respectively coupled to the outputs O of the delay elements 54, 55. In said embodiment the output of the adder 56 is a signal $S_{I3}$ representing the duration of one rotation of the information carrier 2. The fifth module 48 generates a pulsed signal in response to the signal $S_{I3}$ provided by the adder 56. The generated signal CL comprises 64 pulses per rotation.

FIG. 4 shows the delay loop of the circuit of FIG. 2, comprising the first in first out memory means 36 and the feedback filter means 38 in more detail. In FIG. 4 it is shown that the first in first out memory means 36 comprise a chain of delay elements $\tau_1, \ldots, \tau_{n+2}$. The feedback filter means 38 is integrated with the said memory means 36 in that it is implemented as a FIR-filter having delay elements $\tau_{n-2}, \ldots \tau_{n+2}$ which are part of the said memory means 36. The closed-loop transfer function G(z) of the delay loop formed by the first in first out memory means 36 and the feedback filter means 38 can be written as $$G(z) = \frac{1}{z^{64} - H(z)},$$

wherein H(z) is the transfer function of the FIR-filter 38.

The FIR-filter 38 further comprises multiplication elements $a_{-2}, \ldots, a_{+2}$ for respectively multiplying with a factor 5/32, 5/32, 11/32, 5/32 and 5/32, and an adder 39 for adding output signals of the multiplication elements.

The transfer function H(z) of said FIR-filter 38 is:

$$H(z) = \frac{5}{32}z^{-2} + \frac{5}{32}z^{-1} + \frac{11}{32} + \frac{5}{32}z + \frac{5}{32}z^2$$

The response of the delay loop corresponding to G(z) in the frequency domain is shown in FIGS. 5A and 5B. FIG. 5A shows the magnitude M(f) and FIG. 5B shows the phase φ(f) of then response. From FIG. 5A it is clear that the response has a high magnitude at a basis frequency equal to the rotation frequency (100 Hz in this embodiment) of the information carrier 2 and at multiples of that frequency, while on the other hand the magnitude of the transfer function rapidly decays if the frequency deviates from those frequencies. However, also around the clock frequency (6.4 kHz) of the clock signal CL the transfer function has a high magnitude due to aliasing effects. In order to suppress these contribution to the transfer function, the control signal generating means 22 are provided with a reconstruction filter 40.

Outputs of the delay elements $\tau_{n-m}, \ldots, \tau_n$ are coupled to respective inputs of a selection element 41. An output of the selection element 41 is coupled to the reconstruction filter 40. This makes it possible to adjust the phase of the output signal of the reconstruction filter 40 to the delay in the first in first out memory means 36.

The reconstruction filter 40 is shown in more detail in FIG. 6. The filter 40 shown is basically a second-order low-pass IIR filter which is controllable by a parameter ρ. The IIR-filter 40 of FIG. 6 comprises a first subtractor 60 for subtracting a feedback signal $S_{FB}$ from the input signal $S_{DL2}$. An output signal of the first subtractor 60 is multiplied with a parameter ρ in a first multiplier 61. The multiplied output signal is provided to a first input of a first adder 62. An output signal of said first adder 62, delayed by a delay element 63 is provided to a second input of the first adder 62. The output signal of the first adder 62 is further provided to a first input of a subtractor 64. The subtractor 64 has a second input for receiving the feedback signal $S_{FB}$. The output signal of the subtractor 64 is amplified by a second amplifier 65 with the parameter ρ and the amplified signal is added to the feedback signal $S_{FB}$ in a second adder 66. The output signal of this adder is also the output signal of the reconstruction filter 40. The output signal is delayed by a delay element 67 so as to obtain the feedback signal $S_{FB}$. The reconstruction filter shown has a transfer function F(z) defined by $$F(Z) = \frac{\rho^2 z^2}{z^2 - (2 - \rho - \rho^2)z + (1 - \rho)}$$

The magnitude M(f) of the combined response of the delay loop 34, 36, 38 and the reconstruction filter 40 is shown in FIG. 7. In said response the aliasing effects are strongly suppressed.

Another implementation of the first in first out memory means 36 is shown in FIG. 8. In that implementation the memory means 36 are in the form of a RAM 70 having an address controller 71 for cyclically changing the read and the write address. The address controller 71 is in the form of a counter which increases the read address with 1 at each clock pulse of the clock CL. A write address is calculated by adding a constant n, for example 64, to the read address with an adder 72. A selection element 73, controlled by a read/write signal selects either the read or the write address. The selected address is used to read or write the RAM 70.

FIG. 9 shows an alternative embodiment of the correction signal generating means. In FIG. 9, parts corresponding to those of FIG. 2 have a reference number which is 100 higher. Said embodiment is characterized in that the correction signal generating means include differentiating means 131 via which the delay loop 125 is coupled to the difference signal generating means 20. The correction signal generating means further include integrating means 133 for integrating an output signal $S_{DL2}$ of the delay loop 125. The output signal $S_{DIF}$ of the differentiating means 131 can be represented by a relatively small number of bits in comparison to the number of bits required for the input signal $S_{PI}$. This embodiment therefore has the advantage that the delay loop 125 requires a relatively small amount of memory space, so that it can be easily integrated in a VLSI-implementation. The correction signal generating means 122 include the integrating means 133 to compensate for the differentiation.

In the embodiment of FIG. 9 the transducer (not shown) comprises means for mapping a radiation beam at a scanning spot of the information carrier. The difference signal generating means generate a first difference signal RE indicative of the radial position of the scanning spot and a second difference signal FE indicative of a property of the scanning spot. The delay loop 125 is coupled to the difference signal generating means by a multiplexer 129 which provides a multiplexed signal $S_{PI}$ to the delay loop 125, which is derived from the first RE and the second difference signal FE. In this case a first input signal of the multiplexer 129 is a signal $S_{PIR}$, which is the output signal of a PI-controller in response to the first difference signal RE. A second input signal of the multiplexer 129 is a signal $S_{PIF}$, which is the output signal of a PI-controller in response to the second difference signal FE. More in particular the samples of the signal $S_{PI}$ are alternately taken from the signal $S_{PIR}$ and the signal $S_{PIR}$. The device further comprises a demultiplexer 141 coupled to an output of the delay loop 125 in order to generate a first output signal $S_{DLR}$ related to the first difference signal RE and a second output signal $S_{DLR}$ related to the second difference signal FE. The demultiplexer 141 is coupled to the output of the delay loop 125 via the integrating means 133.

An embodiment of the differentiating means 131 is shown in more detail in FIG. 10. The differentiating means 131 comprise delay elements 180, 180' for delaying the input signal $S_{PI}$ by two clockcycles. A subtractor 181 subtracts the delayed input signal from the input signal $S_{PI}$. As the input signal $S_{PI}$ is delayed by two clock cycles in the delay elements 180, 180', either two succeeding samples of the signal $S_{PIR}$ or two succeeding samples of the signal $S_{PIF}$ are subtracted from each other. An adder 182 adds a feedback signal to the output signal of subtractor 181. An output signal of adder 182 is limited by limiter 183. The output signal $S_{DIF}$ of the limiter 183 is also the output signal of the differentiator 131. In a practical embodiment the limiter may generate an output signal which is limited to the values −1, 0, +1. In a subtractor 184 the output signal of the limiter 183 is subtracted from the input signal of the limiter 183 and delayed by delay element 185, 185'. The output signal of the delay element 185, 185' serves as the feedback signal. In the embodiment of FIG. 10 the limiter 183 has the effect that the performance of the delay loop 125 is hardly influenced by spurious signals. Since the difference of the input and the output signal $S_{DIF}$ of the limiter 183 are coupled back via the delay element 185, 185', systematic deviations as a result of the limiter 183 are prevented.

The feedback filter 138 and a portion of the delay means 136 is shown in more detail in FIG. 11. As compared to the embodiment shown in FIG. 4 each delay elements $\tau_i$ is replaced by two succeeding delay elements $\tau_i$ and $\tau_i'$. The multiplication elements a−2, ... a2 have an input which is respectively coupled to the outputs of the delay elements $\tau_{n-2}'$, ... $\tau_{n+2}'$. This has the effect that the FIR-filter alternatively calculates a feedback value related to the radial error RE and a feedback value related to the focus error FE.

The integrating means 133 are shown in more detail in FIG. 12. In that embodiment the integrating means 133 comprises an integrating module $133_B$ and a leak module $133_B$. The latter comprises combination means 190 for subtracting a leak signal $S_L$ from the input signal $S_{DL2}$ of the integrating means. An output of the combination means 190 is coupled to an input of addition means 191 to add the output signal of the means 190 to a feedback signal $S_{FBI}$. The feedback signal $S_{FBI}$, which is also the output signal of the integrator, is obtained by limiting the signal provided by the addition means 191 in limiter 192 and delaying the limited signal with delay elements 193 and 193'. By subtracting the leak signal $S_L$ it is prevented that a bias can occur in the integrating means. The leak signal $S_L$ is calculated from the feedback signal $S_{FBI}$ by the module $133_B$. This module $133_B$ comprises combination means 194 for adding the feedback signal $S_{FBI}$ to a delayed error signal $S_{DEF}$. The output of the combination means 194 is multiplied by a factor 1/K in a multiplication element 195 so as to obtain the leak signal $S_L$. K is a value greater than 1. Preferably K is a power of two, so that the multiplication can be implemented as a bit shift. The leak signal $S_L$ is multiplied by K in multiplier 196 and in subtractor 197 the result is subtracted from the output of combination means 194 to obtain an error signal $S_E$. This error signal $S_E$ is delayed by delay elements 198, 198' to obtain the delayed error signal $S_{DE}$.

It is remarked that the scope of protection of the invention is not restricted to the embodiments described herein. For example, while an embodiment of the apparatus according to the invention is described in which a clock signal which is indicative of the rotation speed of the information carrier is derived from circuit means which are coupled to the motor, such a clock signal may also be derived from data which is read from the disc. Neither is the scope of protection restricted by the reference numerals included in the claims. The word 'comprising' does not exclude other parts than those mentioned in a claim. The word 'a(n)' preceding an element does not exclude a plurality of those elements. The invention further resides in each new feature or combination of features.

What is claimed is:

1. A device for scanning a rotating information carrier (2) comprising
   rotating means (4) for rotating the information carrier around an axis (6),
   a transducer (10) for converting a write signal ($S_W$) into a detectable pattern at the information carrier, and/or for detecting a pattern at the information carrier and generating a read signal ($S_R$) in response thereto,
   control means (20, 22) for controlling a scanning parameter of the transducer (10), wherein the control means comprise
      difference signal generating means (20) for generating a difference signal (RE) which is indicative of a difference between a current value and a desired value of the scanning parameter,
      collection signal generating means (22) for generating a correction signal ($S_C$) in response to the difference signal (RE), the correction signal generating means (22) comprising a delay loop (25) which includes combination means (34) for generating a combination signal ($S_{COM}$) out of a feedback signal ($S_F$) and an input signal ($S_{PI}$) derived from the difference signal (RE), first in first out memory means (36) for generating a delayed signal ($S_{DL1}$) out of the combined signal and feedback means (38) for generating the feedback signal ($S_F$) out of the delayed signal ($S_{DL1}$),
   and wherein the device comprises rotation speed detecting means (8) for generating a clock signal (CL) having a frequency which is indicative of the rotation speed of the information carrier (2), the delay in the memory means (36) being proportional to a period of the clock signal (CL), characterized in that the transducer (10) comprises means for mapping a radiation beam (12) at a scanning spot (14) of the information carrier (2) and in that the difference signal generating means generate a first difference signal (RE) indicative of the radial position of the scanning spot (14) and a second difference signal (FE) indicative of a property of the scanning spot (14), and in that the delay loop (125) is coupled to the difference signal generating means (22, 122) by multiplexing means (129) which provide a multiplexed signal ($S_{PI}$) to the delay loop (125), which is derived from the first and the second difference signal, the device further comprising a demultiplexer (141) coupled to an output of the delay loop (125) in order to generate a first output signal ($S_{DLR}$) related to the first difference signal and a second output signal ($S_{DLF}$) related to the second difference signal.

2. A device for scanning a rotating information carrier (2) comprising
   rotating means (4) for rotating the information carrier around an axis (6),
   a transducer (10) for converting a write signal ($S_W$) into a detectable pattern at the information carrier, and/or detecting a pattern at the information carrier and generating a read signal ($S_R$) in response thereto.
   control means (20, 22) for controlling a scanning parameter of the transducer (10), wherein the control means comprise
      difference signal generating means (20) for generating a difference signal (RE) which is indicative of a difference between a current value and a desired value of the scanning parameter,
      correction signal generating means (22) for generating a correction signal ($S_C$) in response to the difference signal (RE) the correction signal generating means (4) comprising a delay loop (25) which includes combination means (34) for generating a combination signal ($S_{COM}$) out of a feedback signal ($S_F$) and an input signal ($S_{PI}$) derived from the difference signal (RE), first in first out memory means (36) for generating a delayed signal ($S_{DL1}$) out of the combined signal and feedback means (38) for generating the feedback signal ($S_F$) out of the delayed signal ($S_{DL1}$),
   and wherein the device comprises rotation speed detecting means (8) for generating a clock signal (CL) having a frequency which is indicative of the rotation speed of the information carrier (2), the delay in the memory means (36) being proportional to a period of the clock signal (CL), characterized in that the rotation speed detecting means (8) comprise
      a first module (42) for generating a signal ($S_i$) having a first frequency (f1) which is indicative of the rotation speed of the information carrier (2), a second module (44) coupled to the first module (42) for generating a first intermediate signal ($S_{I1}$) having a second frequency (f2) which is lower than the first frequency by an integer factor, a third module (46), coupled to the second module (44), for generating a second intermediate signal ($S_{I2}$) which is an indication of the duration D between two successive pulses of the first intermediate signal ($S_{I1}$), a fourth module (48) coupled to the third module (46) for generating an output signal (CL) having a frequency which is dependent on the second intermediate signal ($S_{I2}$).

3. A device according to claim 2, characterized in that the fourth module (48) is coupled to the third module (46) via a fifth module (50), which fifth module comprises a first input (51) for receiving the first intermediate signal ($S_{I1}$), a second input (52) for receiving the second intermediate signal ($S_{I2}$), and an output (53) for providing to the fourth module (46) a third intermediate signal ($S_{I3}$) which is indicative of a sum of mutually successive values of durations D.

4. A device for scanning a rotating information carrier (2) comprising a transducer (4) for rotating the information carrier around an axis (6), a transducer (10) for converting a write signal ($S_W$) into a detectable pattern at the information carrier, and/or for detecting a pattern at the information carrier and generating a read signal ($S_R$) in response thereto, control means (20, 22) for controlling a scanning parameter of the transducer (10), wherein the control means comprise difference signal generating means (20) for generating a difference signal (RE) which is indicative of a difference between a current value and a desired value of the scanning parameter, correction signal generating means (22) for generating a correction signal ($S_c$) in response to the difference signal (RE), the correction signal generating means (22) comprising a delay loop (25) which includes combination means (34) for generating a combination signal ($S_{COM}$) out of a feedback signal ($S_F$) and an input signal ($S_{PI}$) derived from the difference signal (RE), first in first out memory means (36) for generating a delayed signal ($S_{DL1}$) out of the combined signal and feedback means (38) for generating the feedback signal ($S_F$) out of the delayed signal ($S_{DL1}$), and wherein the device comprises rotation speed detecting means (8) for generating a clock signal (CL) having a frequency which is indicative of the rotation speed of the information carrier (2), the delay in the memory means (36) being proportional to a period of the clock signal (CL), characterized in that the correction signal generating means (22) comprises signal separating means (27) for separating the difference signal (RE) into a high frequency component ($S_H$) and a low frequency component ($S_L$), the correction signal generating means (22) comprising HF-means (32) for processing the high-frequency component ($S_H$) of the signal and LF-means (26, 28, 30, 25, 40) for processing the low frequency component ($S_L$) thereof.

5. A device for scanning a rotating information carrier (2) comprising rotating means (4) for rotating the information carrier around an axis (6), a transducer (10) for converting a write signal ($S_W$) into a detectable pattern at the information carrier, and/or for detecting a pattern at the information carrier and generating a read signal ($S_R$) in response thereto, control means (20, 22) for controlling a scanning parameter of the transducer (10), wherein the control means comprise difference signal generating means (20) for generating a difference signal (RE) which is indicative of a difference between a current value and a desired value of the scanning parameter, correction signal generating means (22) for generating a correction signal ($S_C$) in response to the difference signal (RE), the correction signal generating means (22) comprising a delayed loop (25) which includes combination means (34) for generating a combination signal ($S_{COM}$) out of a feedback signal ($S_F$) and an input signal ($S_{PI}$) derived from the difference signal (RE), first in first out memory means (36) for generating a delayed signal ($S_{DL1}$) out of the combined signal and feedback means (38) for generating the feedback signal ($S_F$) out of the delayed signal ($S_{DL1}$), and wherein the device comprises rotation speed detecting means (8) for generating a clock signal (CL) having a frequency which is indicative of the rotation speed of the information carrier (2), the delay in the memory means (36) being proportional to a period of the clock signal (CL), characterized in that the correction signal generating means include differentiating means (131) via which the delay loop (125) is coupled to the difference signal generating means (22, 122) and in that the correction signal generating means further include integrating means (133) for integrating an output signal ($S_{DL2}$) of the delay loop (125).

6. A device for scanning a rotating information carrier (2) comprising rotating means (4) for rotating the information carrier around an axis (6), a transducer (10) for converting a write signal ($S_w$) into a detectable pattern at the information carrier, and/or for detecting a pattern at the information carrier and generating a read signal ($S_R$) in response thereto, control means (20, 22) for controlling a scanning parameter of the transducer (10), wherein the control means comprise difference signal generating means (20) for generating a difference signal (RE) which is indicative of a difference between a current value and a desired value of the scanning parameter, correction signal generating means (22) for generating a correction signal ($S_c$) in response to the difference signal (RE), the correction means (22) comprising a delay loop (25) which includes combination means (34) for generating a combination signal ($S_{COM}$) out of a feedback signal ($S_F$) and an input signal ($S_{PI}$) derived from the difference signal (RE), first in first out memory means (36) for generating a delayed signal ($S_{DL1}$) out of the combined signal and feedback means (38) for generating the feedback signal ($S_F$) out of the delayed signal ($S_{DL1}$), and wherein the device comprises rotation speed detecting means (8) for generating a clock signal (CL) having a frequency which is indicative of the rotation speed of the information carrier (2), the delay in the memory means (36) being proportional to a period of the clock signal (CL), characterized in that the correction signal generating means (22) comprise a controller having an integrating unit (28) and a proportional unit (26), the delay loop (25) being coupled to the difference signal generating means (20) via the controller (26, 28).

* * * * *